(12) United States Patent
Price

(10) Patent No.: US 7,358,478 B2
(45) Date of Patent: Apr. 15, 2008

(54) MULTIPARALLEL THREE DIMENSIONAL OPTICAL MICROSCOPY SYSTEM

(75) Inventor: Jeffrey H. Price, Solana Beach, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/433,049

(22) Filed: May 12, 2006

(65) Prior Publication Data

US 2007/0063152 A1    Mar. 22, 2007

Related U.S. Application Data

(63) Continuation of application No. 09/837,871, filed on Apr. 17, 2001, now abandoned.

(60) Provisional application No. 60/197,522, filed on Apr. 18, 2000.

(51) Int. Cl.
*H01J 3/14* (2006.01)

(52) U.S. Cl. ........................ 250/216; 358/368

(58) Field of Classification Search ............ 250/208.1, 250/216; 359/368, 379, 381
See application file for complete search history.

(56) References Cited

U.S. PATENT DOCUMENTS

| | | | |
|---|---|---|---|
| 5,034,613 A | 7/1991 | Denk et al. | |
| 5,485,001 A | 1/1996 | Kusaka | |
| 5,548,661 A | 8/1996 | Price et al. | |
| 5,737,084 A * | 4/1998 | Ishihara | 356/609 |
| 5,790,692 A | 8/1998 | Price et al. | |
| 5,838,648 A | 11/1998 | Litsche et al. | |
| 5,932,872 A | 8/1999 | Price | |
| 6,024,283 A | 2/2000 | Campanelli et al. | |
| 6,028,306 A * | 2/2000 | Hayashi | 250/235 |
| 6,128,077 A | 10/2000 | Jovin et al. | |
| 6,382,510 B1 | 5/2002 | Ni et al. | |
| 6,640,014 B1 | 10/2003 | Price et al. | |
| 2002/0001089 A1 | 1/2002 | Price | |

* cited by examiner

*Primary Examiner*—Stephen Yam
(74) *Attorney, Agent, or Firm*—Fish & Richardson P.C.

(57) ABSTRACT

A system for imaging of a sample is disclosed. The system includes a plurality of detectors which are each focussed at a respective focal plane in a sample volume. The system also includes light selection optics positioned between the plurality of detectors and the sample volume. The light selection optics transmit to the detectors a portion of light originating at the respective focal planes while screening out light which originates from outside of the respective focal planes.

64 Claims, 10 Drawing Sheets

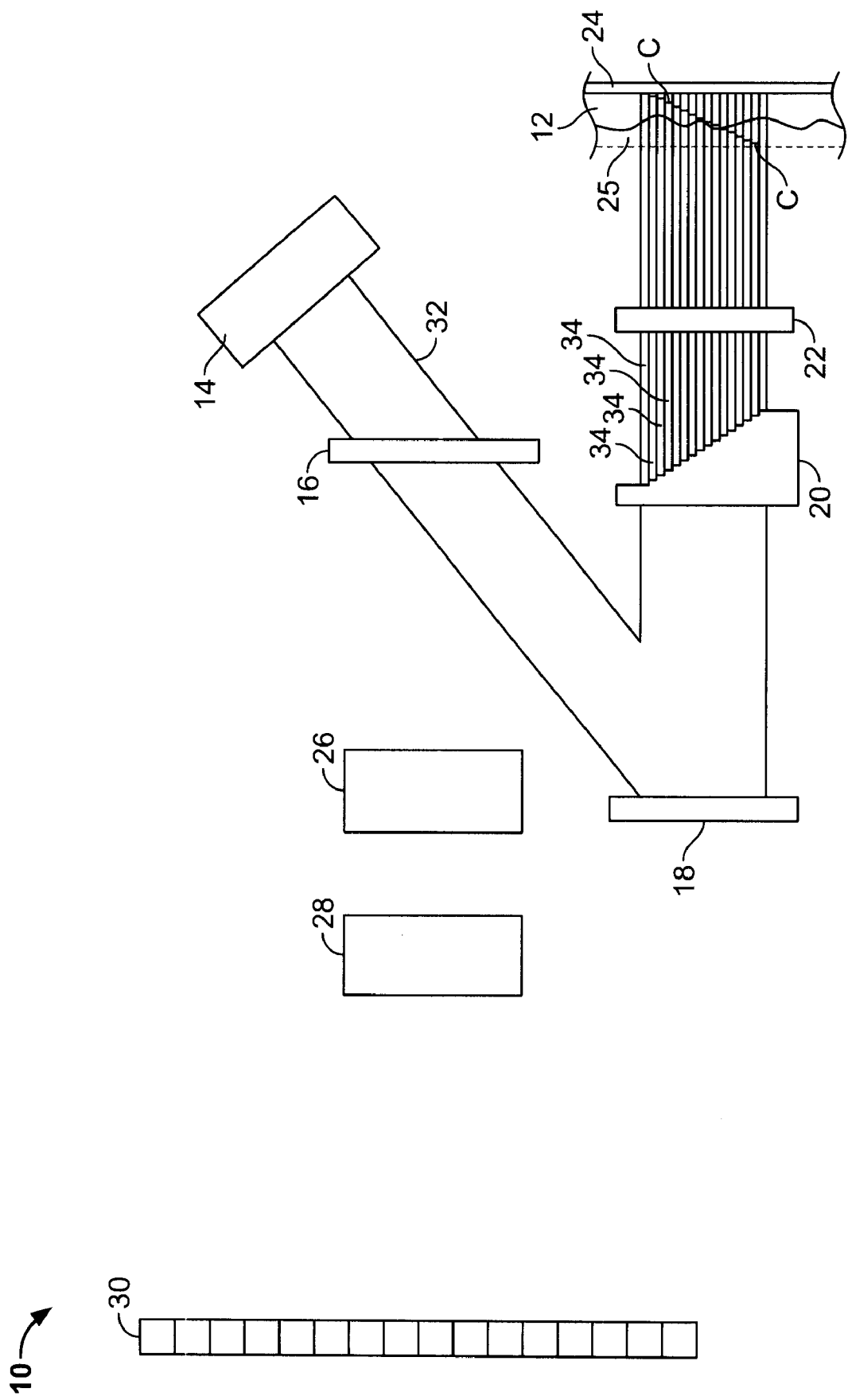

MULTIPARALLEL THREE DIMENSIONAL OPTICAL MICROSCOPY SYSTEM

RELATED APPLICATIONS

This application is a continuation of and claims the benefit of U.S. patent application Ser. No. 09/837,871 entitled "Multiparallel Three Dimensional Optical Microscopy System" and filed on Apr. 17, 2001, now abandoned as US 2002-0001089 A1. The U.S. patent application Ser. No. 09/837,871 further claims the benefit of U.S. Provisional Application No. 60/197,522 entitled "Multiparallel Three dimensional Optical Microscopy System" and filed on Apr. 18, 2000.

BACKGROUND

1. Field of the Invention

The invention relates generally to a system for imaging. In particular, the invention relates to a system for generating three dimensional image of a sample.

2. Background of the Invention

Images of biological samples can be used for diagnostic and prognostic purposes. For instance, technicians observing images of biological samples are often able to identify cancerous tissues. For these applications, three dimensional images are preferred over two dimensional images since three dimensional images often contain information which is not available in a two dimensional image. The current technology for creating three dimensional images results in an exchange between scanning speed and resolution. Specifically, the time required to develop three dimensional images having the desired degree of resolution is so long as to make these images impractical for use in diagnostic and prognostic settings. As a result, there is a need for an apparatus, system and method of quickly developing three dimensional images of biological samples without sacrificing resolution.

SUMMARY OF THE INVENTION

The invention relates to a system for imaging of a sample. The system includes a plurality of detectors which are each focussed at a respective focal plane in a sample volume. The system also includes light selection optics positioned between the plurality of detectors and the sample volume. The light selection optics transmit to the detectors a portion of light originating at the respective focal planes while screening out light which originates from outside of the respective focal planes.

The system can include a light source which illuminates the sample. Light from the sample illuminates the light selection optics as the light travels from sample to the detectors. The light selection optics include a plurality of ON regions and OFF regions which are preferably positioned in an image plane. Light which illuminates the ON regions is received by the detectors and light which illuminates the OFF regions is not received by the detectors. In one embodiment of the light selection optics, the pattern of ON and OFF regions is fixed. In another embodiment of the light selection optics, the pattern of ON and OFF regions is selectable.

The system can also include a plurality of processors which receive output from each of the detectors. Each processor can operate from instructions included on a machine readable medium. Execution of the instructions causes the processors to perform a method for forming and/or measuring a three dimensional image of the sample from the output of the detectors.

The invention also relates to a method for imaging a sample. The method includes providing a plurality of detectors and focussing each of the detectors at a respective focal plane within a sample volume. The method also includes transmitting to the detectors a portion of light originating at the respective focal plane while screening from the detectors light originating from outside the respective focal planes.

The invention is also related to methods of forming the system and methods of operating the system. The invention also relates to a method of forming a three dimensional image of the sample from the detector output.

BRIEF DESCRIPTION OF THE DRAWINGS

FIG. 1B illustrates the path that light travels from a light source to the sample.

DETAILED DESCRIPTION OF THE PREFERRED EMBODIMENT

The invention relates to a system for microscopic imaging of a sample in a sample volume. The system includes a plurality of detectors which are each focussed at a respective focal plane within the sample volume. The focal plane associated with each detector can be positioned at a different distance from a sample holder. Since each detector is focussed at a different depth in the sample, a three dimensional image of the sample can be obtained by combining the image from each detector.

The system can also include light selection optics which transmit light from the sample to the detectors. The light selection optics increase the ratio of intensity of light received at a detector which originates from the associated focal plane to the intensity of light received at the detector which originates from outside the associated focal plane. Hence, the light selection optics improve the resolution of the detector within the respective focal plane. The light selection optics can concurrently increase this ratio for each of the detectors. Hence, the light selection optics increase the resolution of three dimensional image produced by the system.

Figure 1A:
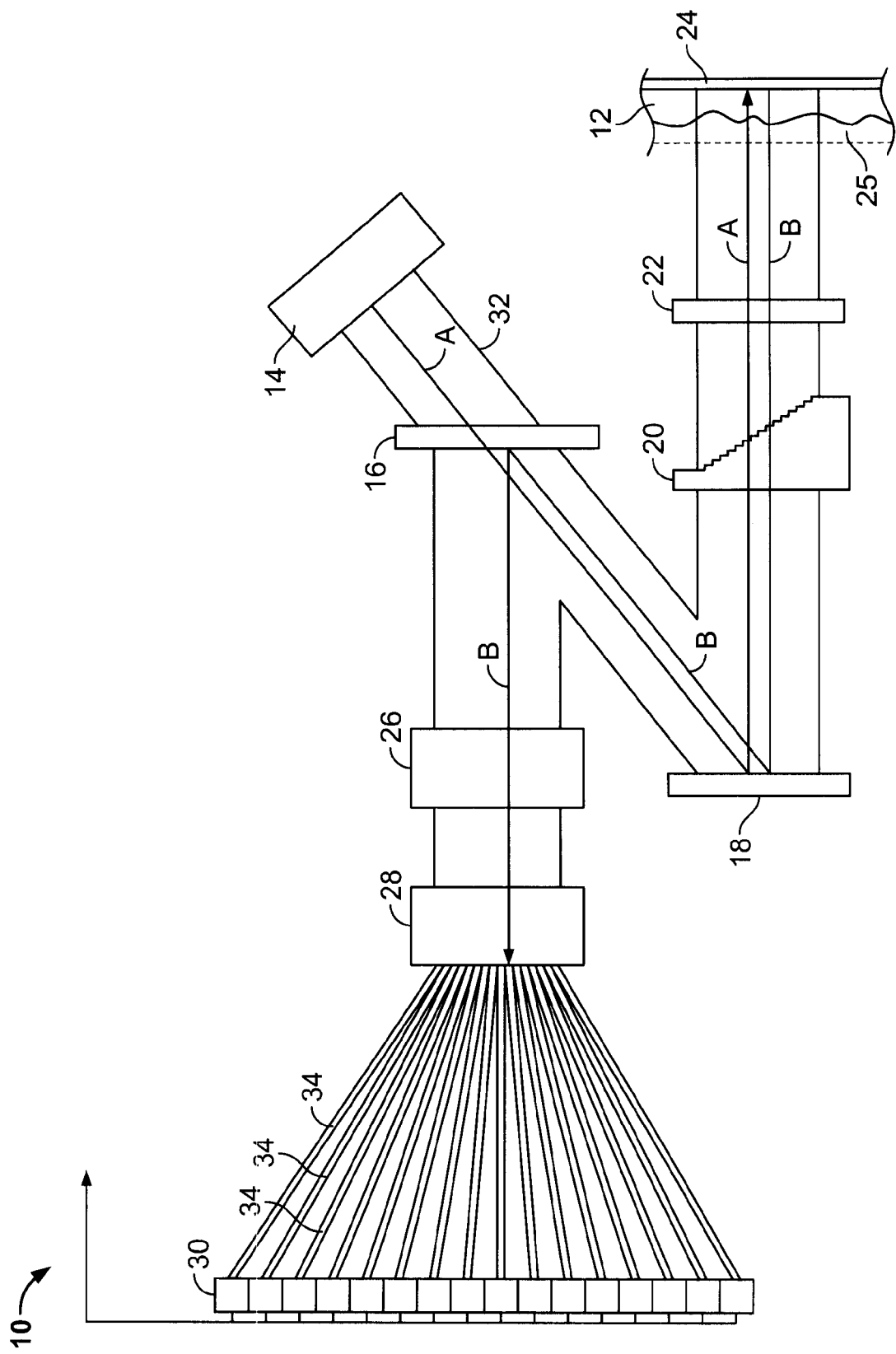
FIG. 1A illustrates a system for microscopic imaging of a sample.

FIG. 1A illustrates a system 10 for viewing a sample 12. The system 10 includes a light source 14, a dichroic mirror 16, light selection optics 18, focus differentiation optics 20, microscope optics 22, a sample holder 24 partially defining a sample volume 25, relay optics 26, divergence optics 28 and a plurality of detector assemblies 30. During operation of the system 10, light travels from the light source 14 to illuminate a sample 12 positioned within the sample holder 24 along the path illustrated by the arrow labeled A. Light then travels from the sample 12 to the detector assemblies 30 along the path illustrated by the arrow labeled B.

FIG. 1B illustrates the operation of the system 10 with respect to light travelling from the light source 14 to the sample volume 25. A suitable light source 14 includes, but is not limited to, a Kr/Ar continuous wave laser having greater than 1 W per line at 488, 568 and 647 nm and a 488 nm Argon laser. These lasers are available from Spectrophysics Lasers of Mountain View, Calif. A laser producing light of multiple wavelengths can be advantageous because multiple images of the sample can be concurrently developed by developing an image at each wavelength. Another suitable light source would be a pulse laser, such as the multiphoton laser capable of producing multiphoton-fluorescence as described in U.S. Pat. No. 5,034,613 entitled "Two Photon Laser Microscopy".

The light source 14 produces a light beam 32 which at least partially passes through the dichroic mirror 16. At least a portion of the light from the dichroic mirror 16 is reflected off the light selection optics 18 toward the focus differentiation optics 20 where a plurality of sub-beams 34 are defined in the light beam 32. The mechanism by which the sub-beans 34 are defined is discussed in further detail with respect to FIG. 3A.

The sub-beams from the focus differentiation optics 20 pass through microscope optics 22 to a sample 12 within the sample volume 25. Although not illustrated, the microscope optics 22 cause the sub-beams to converge as they travel toward the sample volume 25. The sub-beams 34 illuminate a sample 12 in the sample volume 25 and cause one or more dyes within the sample 12 to fluoresce. Alternatively, the light from the light beam 32 can be reflected from the sample. The system 10 can be easily adapted for use with light reflected from a sample by replacing the dichroic mirror 16 with a polarization selective element which transmits light of one polarization and reflects light of another polarization.

Figure 1C:
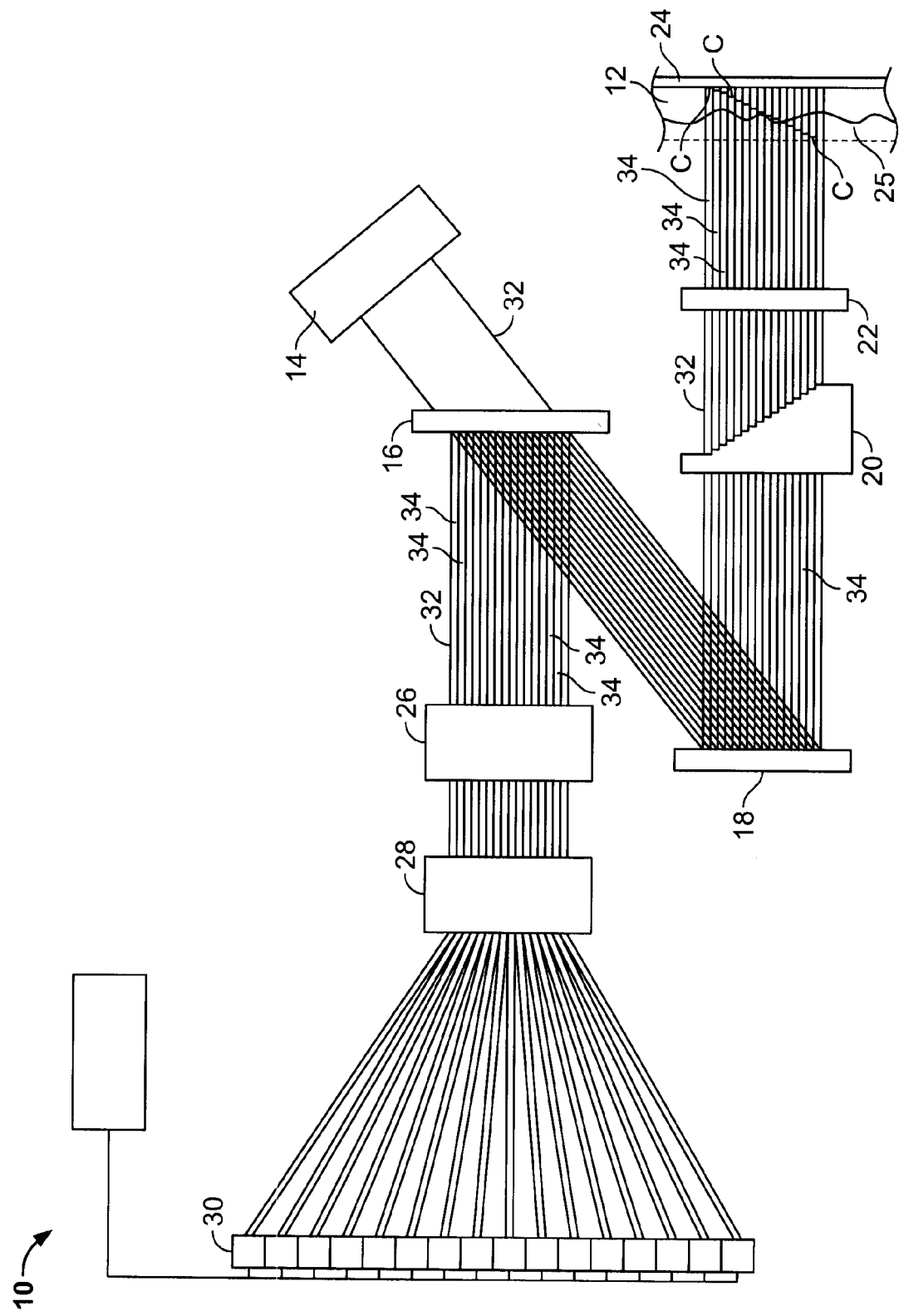
FIG. 1C illustrate the path that light travels from the sample to a plurality of detectors.

FIG. 1C illustrates the operation of the components of the system 10 on the light as it travels from the sample volume 25 toward the detector assemblies 30. The light can be light from the sample fluorescing, a portion of the light beam reflected from the sample and/or a combination of the two. The light from the sample is illustrated as a plurality of sub-beams since the sub-beams illustrated in FIG. 1B are the cause of the light from the sample. The sub-beams from the sample volume 25 pass through the microscope optics 22 and the focus differentiation optics 20 to the light selection optics 18. At least a portion of one sub-beam is reflected from the light selection optics 18 toward the dichroic mirror 16. A portion of the sub-beam 34 is reflected from the dichroic mirror 16 toward the relay optics 26. The relay optics 26 can be used to provide a degree of magnification which optimizes the operation of the beam divergence optics 28 and/or to provide additional magnification. The sub-beams from the relay optics 26 pass to the divergence optics 28. The divergence optics 28 separate the sub-beams so each sub-beam can be received by a detector assembly 30.

As illustrated, each sub-beam originates in a respective focal plane, C, of the sample 12 to a particular detector assembly 30. As a result, each detector 56 has a view of a particular plane of the sample different from the focal plane viewed by any other detector. The output from each detector assembly 30 is received by one or more processing units which process the output to provide a three dimensional image of the sample 12.

Figure 2:
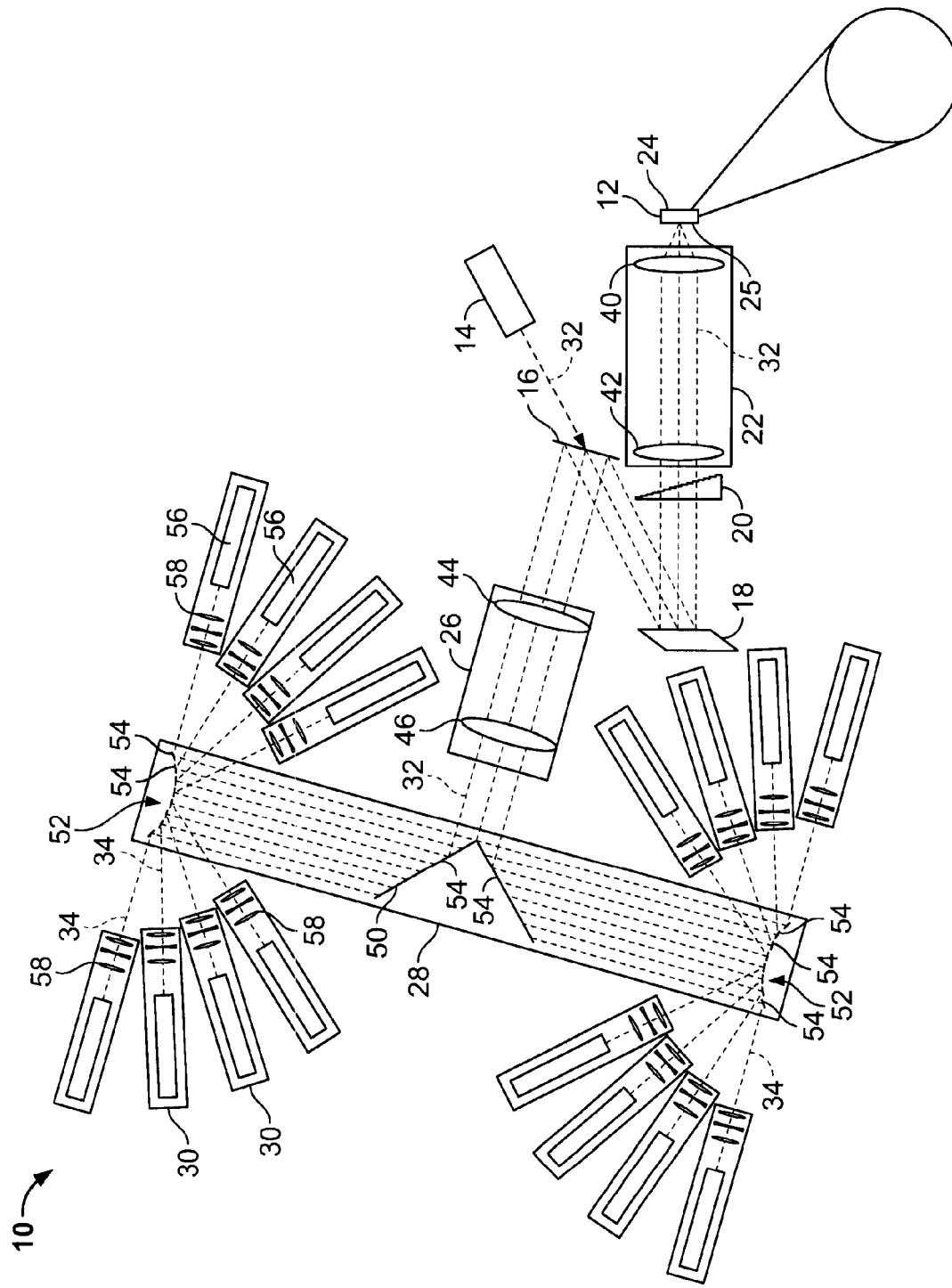
FIG. 2 is a more detailed illustration of the system illustrated in FIG. 1A.

FIG. 2 is a more detailed illustration of one embodiment of the system 10 of the microscope optics according to this invention. The microscope optics 22 illustrated in FIG. 2 include a first objective lens 40 and a first imaging lens 42. Many other microscope optics 22 are known in the art and can be used with the system 10 according to this invention. Similarly, the relay optics 26 are also illustrated as having lenses 44 and 46. However, the relay optics 26 are optional and are selected to achieve a desirable enhancement of the system 10. As described above, the relay optics 26 can be used to provide a degree of magnification which optimizes the operation of the beam divergence optics 28 and/or to provide additional magnification of the sample 12. Those schooled in the art will also recognize that these and other relay optics may perform optical filtering to reduce light scatter or perform other functions such as aberration correction. They will also recognize that quarter wave plates (e.g. for reflective microscopy), prisms (e.g. for differential interference contrast microscopy), phase rings (e.g. for phase contrast microscopy), polarizers and many other optical components can be placed in the system to accomplish desired optical configurations for various microscopy modes.

The beam divergence optics 28 includes a primary beam diverger 50 and two secondary beam divergers 52. The primary beam diverger 50 includes two mirrors 54 positioned such that a first portion of the sub-beams travels in a first direction and a second portion of the sub-beams travels in a second direction. The first portion of the sub-beams preferably includes half the total number of sub-beams. For instance, FIG. 2 illustrates 16 sub-beams. The first portion of the sub-beams includes 8 sub-beams and the second portion of the sub-beams includes 8 sub-beams.

The secondary beam divergers 52 are each associated with a portion of the sub-beams. Each second beam diverger includes mirrors 54 having a geometry approximating the geometry of the sub-beam 34 cross section. The mirrors 54 are positioned such that each sub-beam is reflected toward a particular detector assembly 30. As described above, the relay optics 26 can provide additional magnification which can simplify the difficulty associated with matching the mirrors 54 to the sub-beams. Further, the mirrors 54 can be coupled with manual micropositioners and/or micromotors for making fine adjustments to the positioning of the mirrors 54.

Beam divergence optics 28 other than those illustrated in FIG. 2 are possible. For instance the primary beam diverger 50 and the secondary beam divergers 52 can be replaced with a single beam diverger. The single beam diverger would include a different mirror 54 associated with each sub-beam. Each mirror 54 would reflect the associated sub-beam to a particular detector assembly 30. Further, the beam divergence optics 28 can include additional beam divergers. Other beam divergence optics 28 such as fiber optic arrays can be used with a system 10 according to the present invention.

The beam divergence optics can also include one or more wavelength selectors so images can be created using a particular wavelength of light. For instance, one or more dichroic mirrors can be positioned after the mirrors 54 to further divide one or more of the sub-beams into divided sub-beams according to wavelength. A detector 56 can be positioned to receive each divided sub-beam. The detector can then use the light from the divided sub-beam to create an image. Since each divided sub beam generated from the same sub-beam has different wavelength light, each image generated from the divided sub-beams originating from a single sub-beam can be generated using different wavelengths of light.

Each detector assembly 30 includes a detector 56. Each detector is positioned approximately the same distance from the focus differentiation optics. Suitable detectors 56 for use with the system 10 include, but are not limited to, an area array sensor such as the TD 1096 manufactured by EG&G in Sunnyvale, Calif. The TD 1096 time-delayed-and-integrate (TDI) CCD array has 1024×96 pixels of 13×13 $\mu m^2$ each. This sensor integrates in proportion to the number of lines to increase the signal-to-noise ratio and sensitivity. It will also be recognized that many CCD arrays can be configured with electronics for TDI operation. In this manner, the detectors 30 can be switched under electronic control between TDI and area imaging modes.

Each detector assembly 30 also includes magnification adjustment optics 58. Focussing each detector 56 at a different depth within the sample 12 causes the view from each detector 56 to have a different degree of magnification which is typically on the order of 0-5%. The magnification adjustment optics 58 can be set to provide the view from each detector 56 with the same degree of magnification. When the magnification differences are very small, the magnification adjustment optics 58 can be eliminated and the differences ignored. As an alternative to the magnification optics, software for creating the image from the detector 56 output can compensate for these magnification differences.

Although not illustrated, additional relay optics can be positioned between the light selection optics 18 and the focus differentiation optics 20. As will be described in more detail below, the light selection optics are preferably positioned in an image plane. The additional relay optics can create the image plane where the light selection optics 18 can be positioned.

As illustrated in FIG. 1A-FIG. 2, each detector 56 has a view of a different region of the sample 12. Additionally, the view from each detector 56 is focussed at a different depth within the sample 12. Specifically, the focal plane of each sub-beam is positioned at a different distance from the sample holder 24. The relative difference in the positions of the focal plane positions is caused by the focus differentiation optics 20.

Figure 3A:
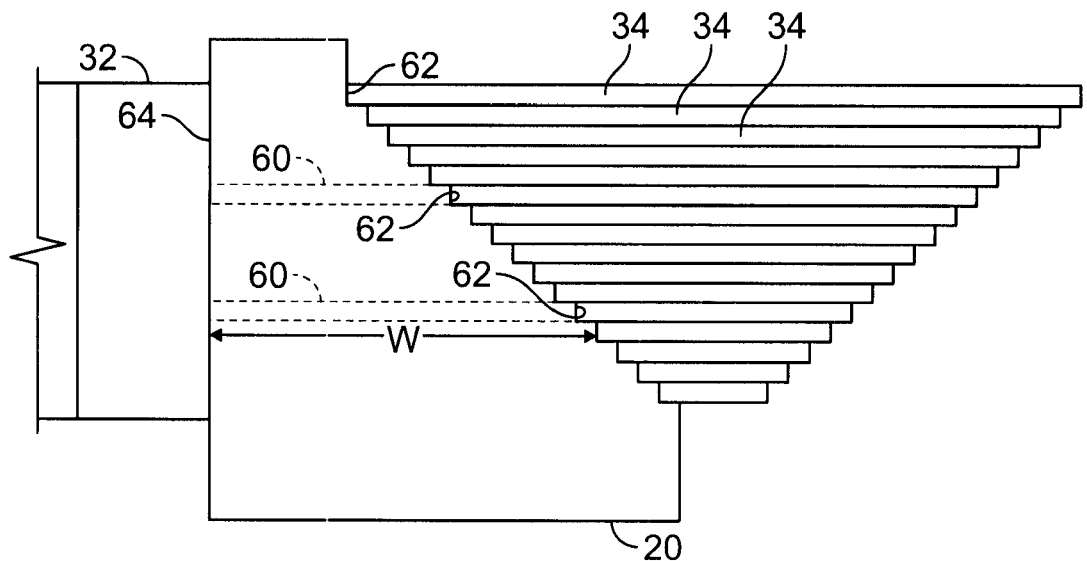
FIG. 3A illustrates a focus differentiation optics which is suitable for use with a system according to the present invention.

FIG. 3A illustrates a suitable focus differentiation optics 20 for use with the present invention. The focus differentiation optics 20 include a translucent material having an index of refraction greater than air. The material has a plurality of sub-beam definition sections 60 which each have a first side 62 positioned at a different distance from a second side 64. Accordingly, each sub-beam definition section 60 has a different width, W. These widths, W, are exaggerated in the figures for the purpose of illustration. The first sides 62 and second side 64 are preferably substantially flat. Additionally, the second side 64 is preferably parallel to each first side 62. Each first side 62 is preferably positioned in an image plane produced by the microscope optics 22.

As illustrated, each detector 56 receives light from the specimen which has primarily passed through a particular sub-beam definition section 60. Since the index of refraction for the material is different than air, refraction causes each sub-beam definition section 60 to have a lens effect on the portion of the light beam 32 passing through the sub-beam definition section 60. This lens effect alters the position of the focal plane for the detector 56 receiving light which has passed through a sub-beam definition section 60. Since the magnitude of the lens effect depends on the width, W, of the sub-beam definition section 60 and since each sub-beam definition section 60 has a different width, the focal plane for each detector 56 is located at a different depth within the sample 12. This effect is illustrated by the marks labeled C in FIGS. 1B-1C. Accordingly, each sub-beam 34 includes the portion of the light beam 32 which is originated in a different focal plane. As illustrated, the focal planes span a depth of the sample 12. As a result, output from the detectors provides information about the sample through the depth of the sample, or a portion of the depth of the sample.

The first sides 62 of the focus differentiation optics 20 illustrated in FIG. 3A are illustrated as being positioned in a stair step pattern. However, the first sides 62 can be positioned in different arrangements in order to provide a different arrangement of focal planes within the sample 12. For instance, the first sides 62 can be arranged in a pyramid shape, etc. A staggered shape, for example, would likely further decrease light scatter between adjacent focal planes, C, by positioning them as far apart as possible in depth.

A plurality of focus differentiation optics 20 can be mounted on a rotable wheel (not illustrated). The wheel can be positioned such that one of the focus differentiation optics 20 is positioned in the light beam 32. The wheel can then be rotated to select which of the focus differentiation optics 20 is positioned in the light beam 32. When the object lens of the microscope optics 22 is changed, the focus differentiation optics 20 can be changed to provide an array of focal planes which span an appropriate depth of the sample 12. Mounting the focus differentiation optics 20 on a wheel allows the focus differentiation optics 20 to be quickly changed along with the object lens.

Figure 3B:
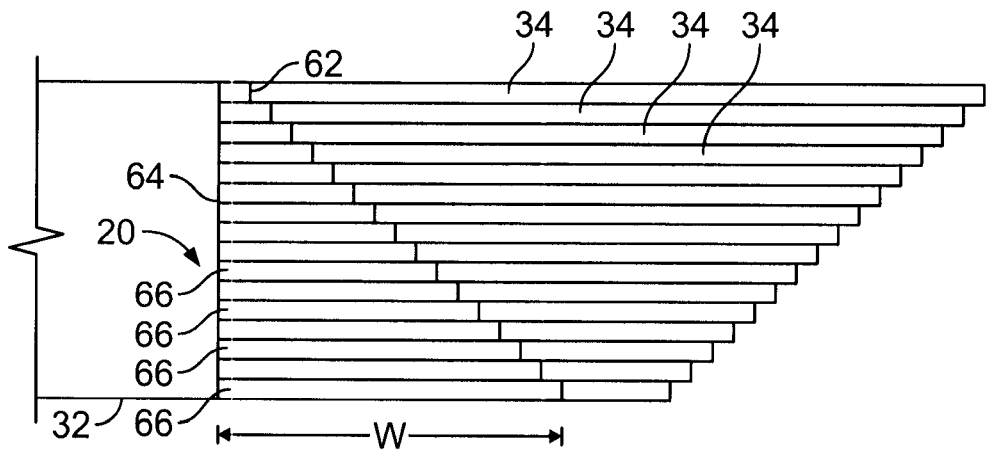
FIG. 3B is a sideview of a focus differentiation optics constructed from a plurality of sub-beam differentiation blocks.
Figure 3C:
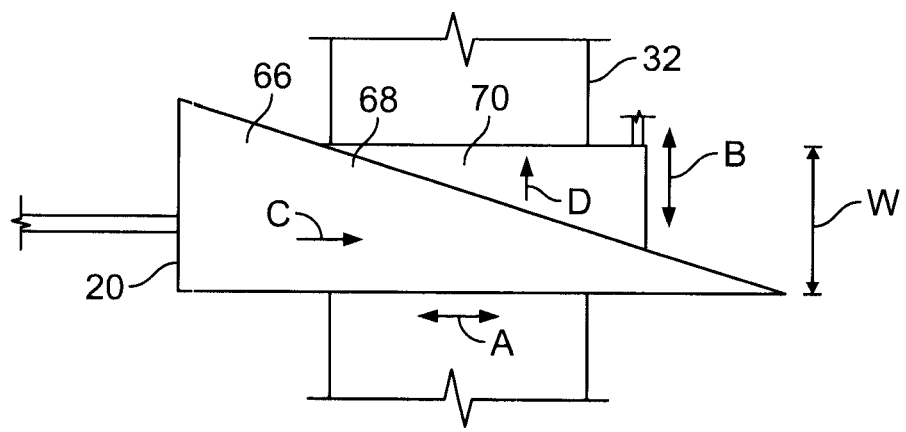
FIG. 3C is a top view of a sub-beam definition block.
Figure 3D:
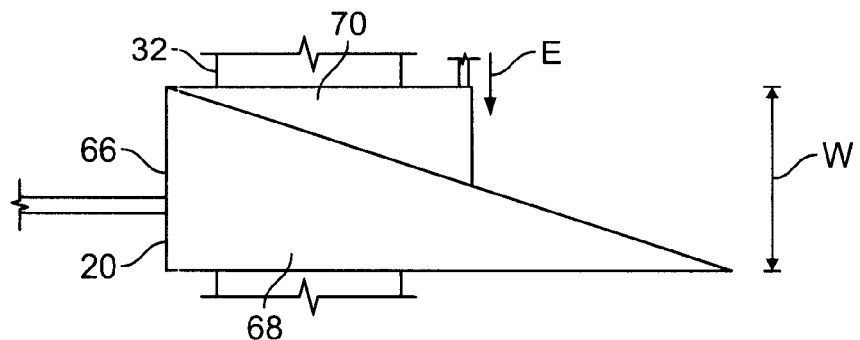
FIG. 3D illustrates a method of increasing the width of the sub-beam differentiation block illustrated in FIG. 3C.

FIGS. 3B-3D illustrate adjustable focus differentiation optics 20. The focus differentiation optics 20 include a plurality of sub-beam definition modules 66 which can be moved independently from one another. The light beam 32 traverses the focus differentiation optics 20 as illustrated in FIG. 3A. The portion of the light beam 32 passing across the width, W, of a sub-beam definition module 66 is formed into a sub-beam 34.

FIGS. 3C and 3D are a topview of a sub-beam definition module 66. Each sub-beam definition module 66 includes a first member 68 and a second member 70 which are movable relative to one another as illustrated by the arrows labeled A and B. The width of the sub-beam definition module 66 can be adjusted by moving the first member 68 relative to the second member 70. For instance, in order to increase the width of the sub-beam definition module 66, the first member 68 is moved toward the second member 70 as illustrated by the arrow labeled C. The second member 70 is mounted so it will not move in the direction illustrated by the arrow labeled A. As a result, the motion of the first member 68 drives the second member 70 in the direction illustrated by the arrow labeled D. As illustrated in FIG. 3D, the movements of the first member 68 and the second member 70 cause the width, W, of the sub-beam definition module 66 to increase. The second member 70 can be biased with a spring mechanism toward the first member 68 as indicated by the arrow labeled E. As a result, the width, W, can also be decreased by moving the first member 68 in the opposite direction of the arrow labeled C. The above structure allows the width, W, of each sub-beam definition module 66 in the focus differentiation optics 20 to be adjusted. As a result, the position of the focal plane for each detector 56 can also be adjusted to a desired distance from the sample holder 24. First member 68 can be moved by positioning screws or micromotor systems than can be computer controlled.

Other focus differentiation optics 20 can be used with a system 10 according to this invention. For instance, the focus differentiation optics 20 can include a plurality of optical fiber bundles, or waveguides, as disclosed in U.S. patent application granted Ser. No. 09/235,215; filed Jan. 22, 1999 and entitled "Automatic On-The-Fly Focussing for Continuous Image Acquisition in High-Resolution Microscopy", and U.S. Pat. No. 5,932,872 entitled "Autofocus System for Scanning Microscopy Having a Volume Image Formation" which are incorporated herein by reference. In the '215 application a detector views a sample through each of the optical fiber bundles. The end of each optical fiber is positioned at a different distance from microscope optics 22 in order to focus each detector at a different depth within the sample. U.S. patent application Ser. No. 09/235,215 also discloses a focus differentiation optics that includes a plurality of mirrors, each of which focuses a detector 56 at a different depth within the sample. The focus differentiation optics can also include sub-beam definition sections which each have a different index of refraction. The different indexes of refraction allow the width, W, of each sub-beam differentiation section to be the same. Further, an embodiment of the focus differentiation optics includes sub-beam definition sections with an electronically adjustable index of refection. Hence, the effective width, W, of each sub beam definition section can be electronically adjusted. A suitable focus differentiation optics including adjustable indexes of refraction include, but are not limited to, a Shapeshifter SSP-128 manufactured by Meadowlark Optics of Fredrick, Colo.

Figure 4:
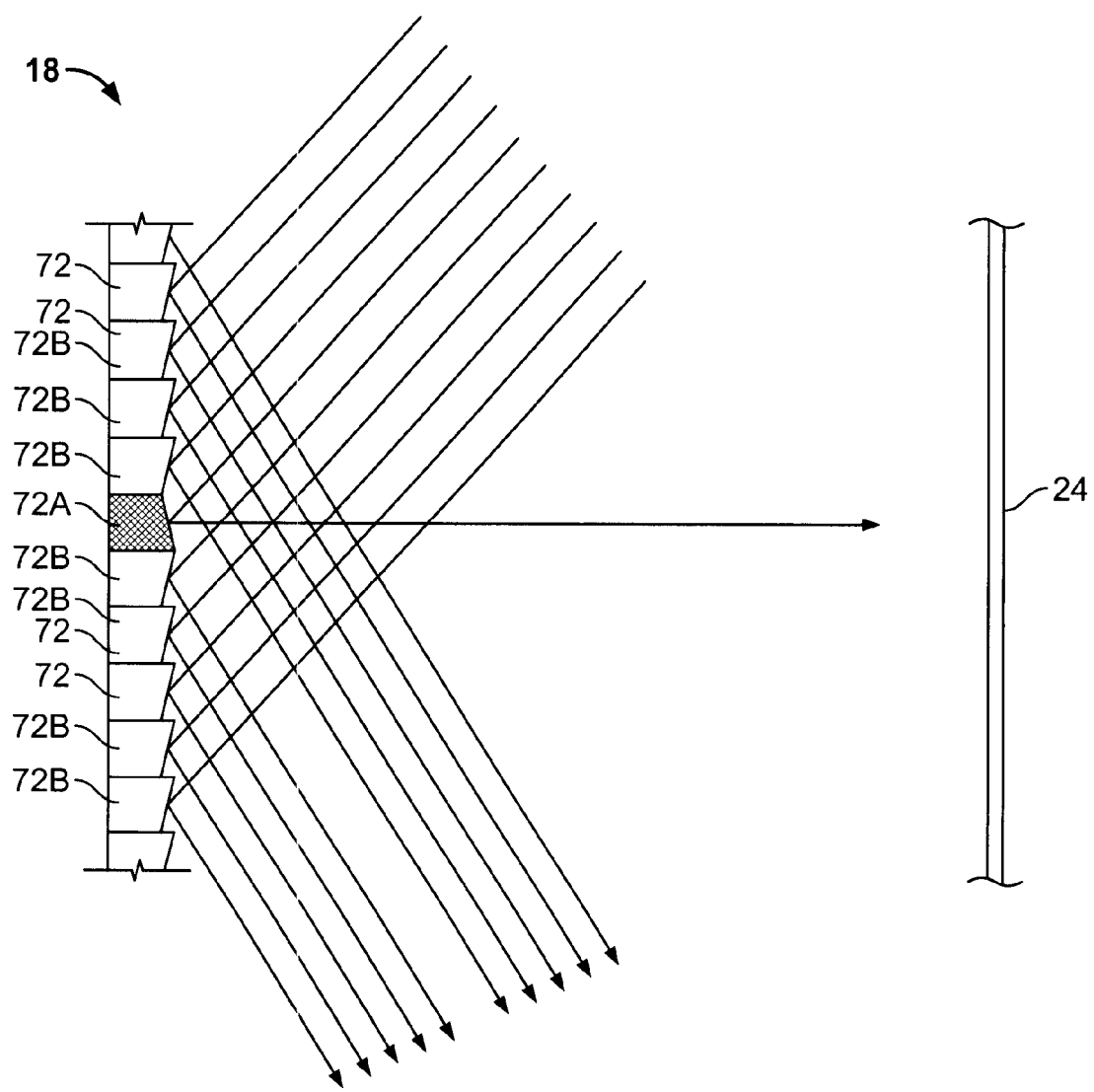
FIG. 4 illustrates operation of light selection optics according to the present invention.

FIG. 4 illustrates an embodiment of the light selection optics 18 according to this invention. The light selection optics transmit a portion of the light originating at the focal planes to the sample and then back to the respective detector while screening out light which does not originate at the focal plane. Accordingly, the light selection optics add a degree of confocality to the view for the detectors. The light selection optics 18 includes a plurality of light selection regions 72 which can be either an ON region 72A or an OFF region 72B. Light striking an ON region 72A is received by the sample and detectors while light striking an OFF region 72B is not received by the sample and detectors. As will be described in more detail below, in one embodiment of the light selection optics 18 each light selection region 72 can be fixed as an OFF region 72B or an ON region 72A. In another embodiment of the light selection optics 18, each light selection region 72 can be switched between being an ON region 72A and an OFF region 72B in order to create different degrees of confocality versus light efficiency.

The light selection regions 72 of the light selection optics 18 illustrated in FIG. 4 can be switched between being an ON region 72A and an OFF region 72B. Each light selection region 72 includes a mirror which can be switched between an ON position and an OFF position. As illustrated, the mirrors in the ON position are held at different angles than the mirrors in the OFF position. When the mirror is in the OFF position, light reflected from the mirror is reflected out of the sub-beam 34. Accordingly, the system 10 no longer processes this light. However, when a mirror is in the ON position, light reflected off the mirror is reflected toward the sample volume 25 in a sub-beam 34. Accordingly, the system 10 continues to process this light. As a result, the light selection optics 18 selects the portion of a sub-beam 34 which is to be processed by the system 10. An example of such a device is the Digital Micromirror Device, also called the Digital Light Processor (DLP), manufactured by Texas Instruments.

Figure 5A:
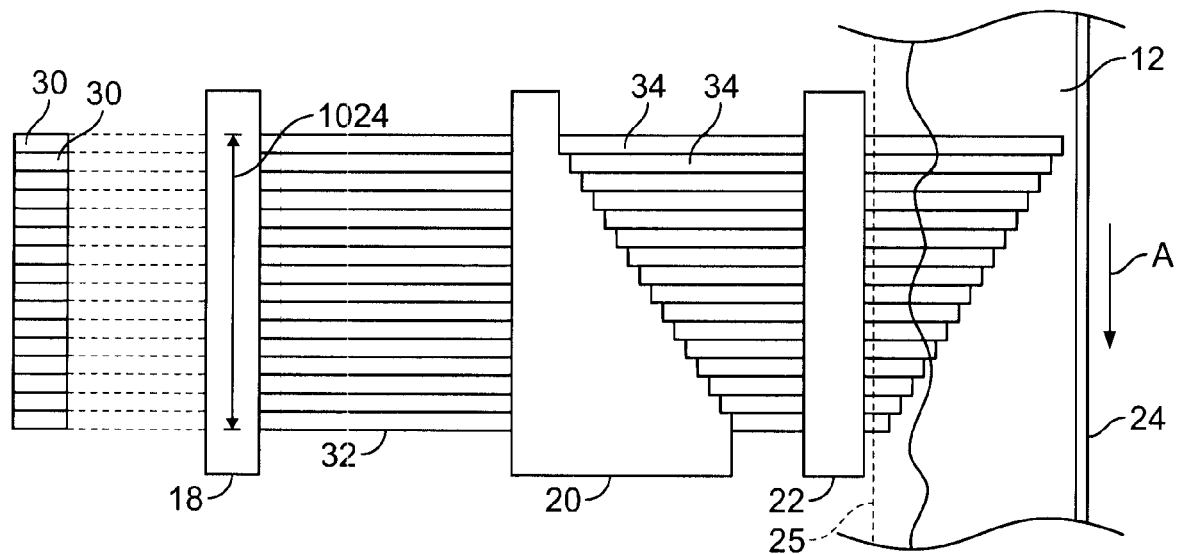
FIG. 5A illustrates the relationship between light selection optics and focus differentiation optics.

FIG. 5A is a simplified illustration showing the relationship between the detector assemblies 30, the light selection optics 18, the focus differentiation optics 20, the microscope optics 22 and the sample 12. The convergence of the sub-beams 34 on the sample 12 caused by the microscope optics 22 is not illustrated. Additionally, although a portion of the sub-beams 34 are reflected off the light selection optics 18, the detector assemblies 30 are shown as receiving light which travels through the light selection optics 18 in order to illustrate the association between each detector assembly 30 and a sub-beam 34.

Figure 5B:
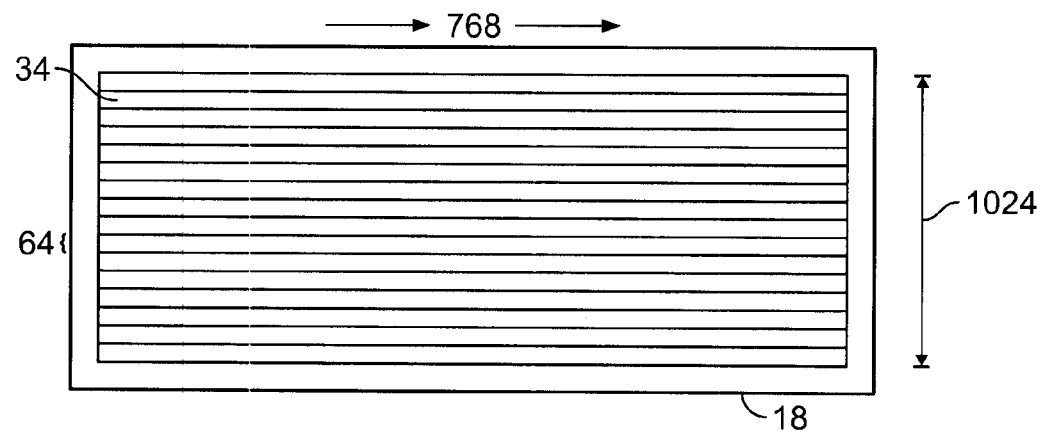
FIG. 5B is sideview of light selection optics according to the present invention.

FIG. 5B is a sideview of the light selection optics 18 illustrated in FIG. 5A. Each sub-beam 34 intersects a different portion of the light selection optics 18. The intersected portion is called a sub-region 74 below. When the light selection optics 18 has the structure illustrated in FIG. 4, the light selection optics 18 preferably includes an array of 1024×768 light selection regions 72. As illustrated, 1024 light selection regions 72 are preferably positioned across the height of the light beam 32 and 768 light selection regions 72 are preferably positioned along the width of the light beam 32. Since the illustrated embodiment of the system 10 has 16 sub-beams 34, each sub-region 74 of the light selection optics 18 includes an array of 64×768 light selection regions 72.

The light selection optics 18 are preferably positioned in an image plane. As a result, the light selection optics 18 increase the ratio of light received at a detector which originates from the associated focal plane to the intensity of light received at the detector which originates from outside the associated focal plane. Hence, the light selection optics provides a degree of confocality to the view from each detector 56. For instance, when a single mirror is in the ON position and the remaining mirrors are in the OFF position, the intensity ratio is very high, i.e., a high degree of confocality is achieved since a large portion of the light from outside the focal plane associated with the mirror is screened out by the mirrors in the OFF position. However, when all of the mirrors are in the ON position, substantially all of the light reflected off the light selection optics 18 is directed toward the sample volume 25. Accordingly, this pattern for the light selection regions 72 does not provide any confocality.

As described above, the light selection optics 18 need not have light selection regions 72 which can be controllably moved between being an ON region 72A and an OFF region 72B. For instance, the light selection optics 18 can be a reflective surface having opaque areas where OFF regions 72B are desired. The resulting degree of confocality which can be provided by such light selection optics 18 will be relatively fixed. In this fixed configuration of the light selection optics 18, it might also be advantageous to use relay optics to pattern light source 14 to preferentially illuminate the ON micromirrors 72A so as to increase the optical efficiency of light source 14.

Figure 6A:
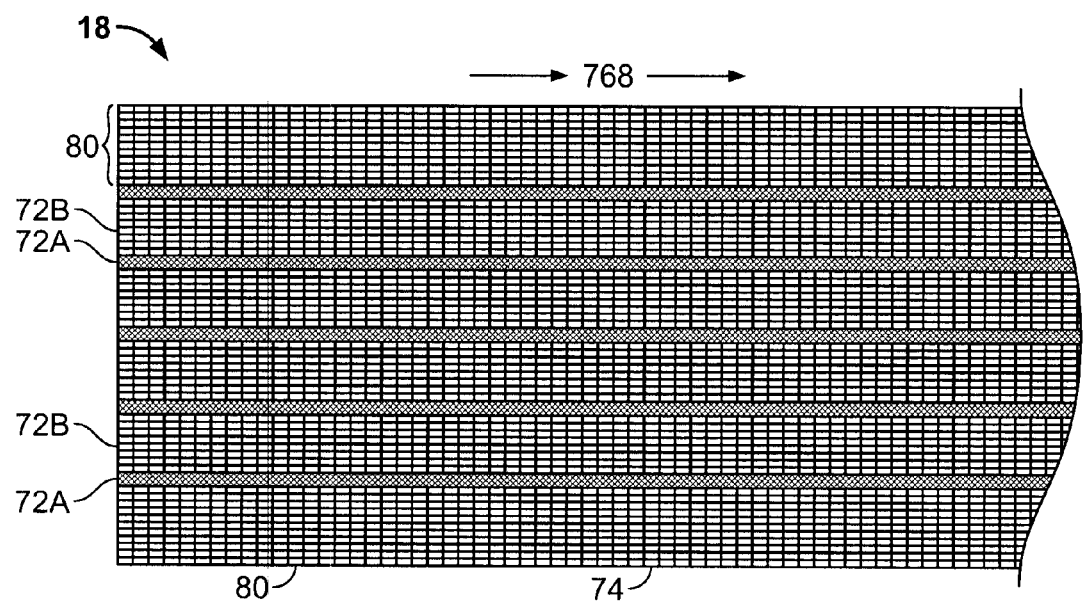
FIG. 6A illustrates a slit pattern for light selecting regions of light selection optics.

FIG. 6A illustrates one pattern that the light selection regions 72 can occupy in a single sub-region 74 during a scan of a sample 12. As described above, each sub-beam 34 falls on a sub-region 74 having a 64×768 array of mirrors. FIG. 6A illustrates one of these 64×768 sub-regions 74. The sub-region 74 includes five 2×768 rows of ON regions 72A separated by four 8×768 rows of OFF regions 72B. When the light selection optics 18 is the light selection optics 18 illustrated in FIG. 4, each ON region 72A includes a 2×768 array of mirrors and each OFF region 72B includes an 11×768 array of mirrors. OFF regions 72B are also positioned at the edges 80 of the sub-region 74. Two of these OFF regions 72B include arrays of 11×768. These OFF regions 72B at the edges 80 of the sub-region 74 are larger than the centrally positioned OFF rows. This arrangement at the edge 80 of the sub-region 74 compensates for diffraction and scatter resulting from the corners of the focus differentiation optics 20 by reducing the amount of this scattered light which is transferred to the detectors.

Figure 6B:
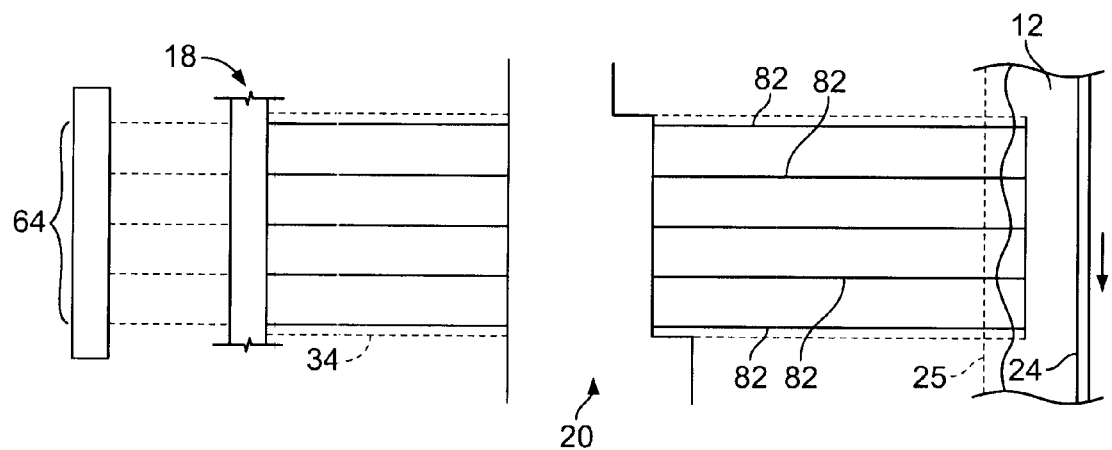
FIG. 6B illustrates the imaging beams selected from the sub-beam by the light selection optics.

FIG. 6B is a simplified illustration of a sub-beam 34 reflected off the light selection optics 18 when the light selection optics 18 has the pattern illustrated in FIG. 6A. Although the outline of the sub-beam 34 is shown, the light selection optics 18 limits the sub-beam 34 to the five illustrated image beams 82. The five image beams 82 are the portion of the sub-beam 34 which is reflected from the five ON rows of the light selection optics 18. Accordingly, the image beams 82 illuminate the portion of the sample 12 which is actually viewed by a detector 56.

Figure 6C:
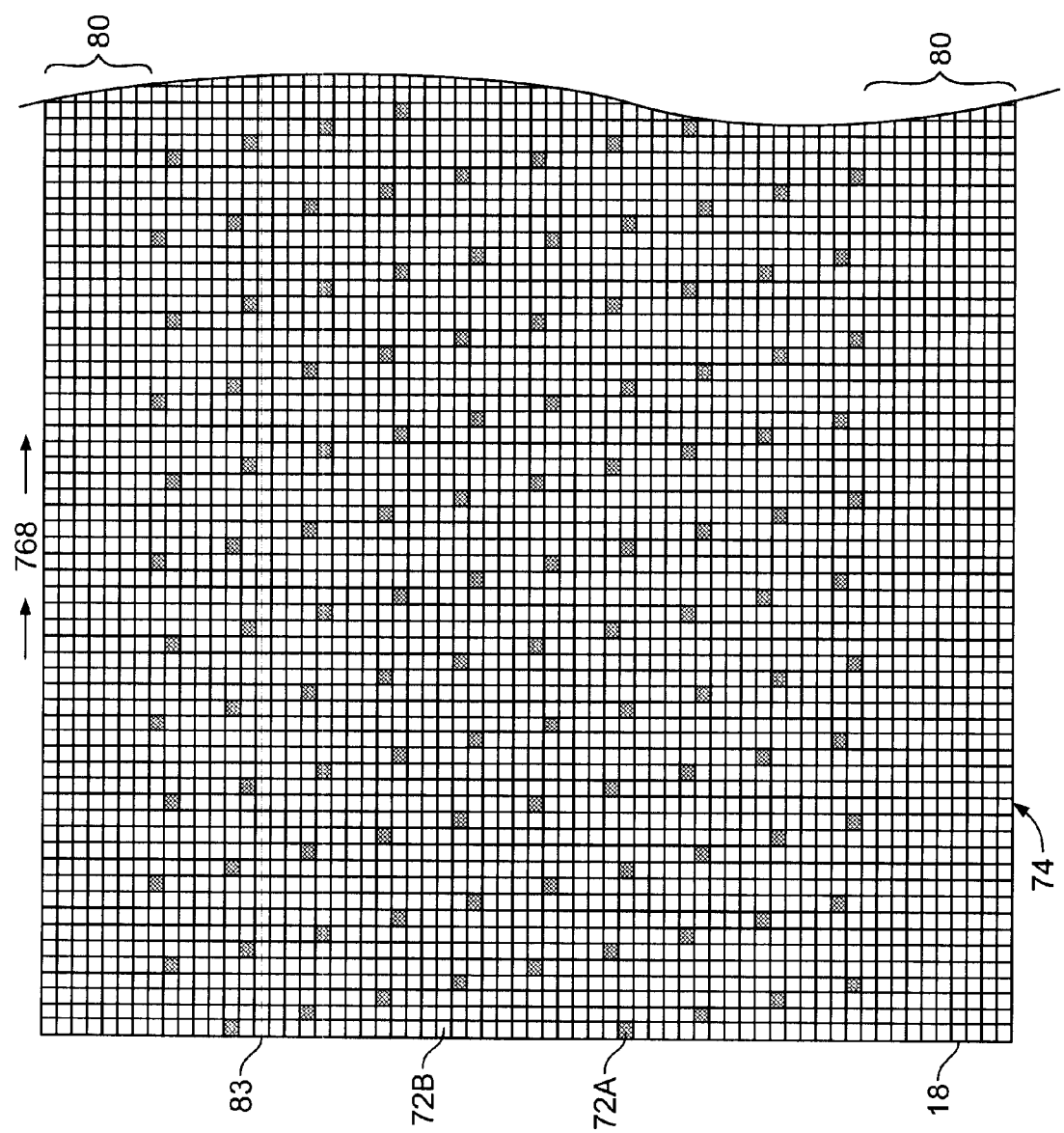
FIG. 6C illustrates a spot pattern for light selecting regions of light selection optics. The spot pattern provides a higher degree of confocality than the slit pattern illustrated in FIG. 6A.

FIG. 6C illustrates another pattern for the light selection regions 72 of a sub-region 74. When the focus differentiation optics include the focus differentiation optics illustrated in FIG. 4, the edges 80 of the sub-region 74 include rows of mirrors in the OFF position. These OFF rows each include a 7×768 array of mirrors. As described above, these OFF rows limit the effects of diffraction from the edges of the focus differentiation optics 20. The remaining portions of the sub-region 74 are divided into 5×5 neighborhoods 83. Each neighborhood 83 includes a single mirror in the ON position and 24 mirrors in the OFF position. These neighborhoods 83 are arranged such that each column of mirrors includes two mirrors which are in the ON position while the remaining mirrors in the column are in the OFF position. Additionally, this arrangement increases the number of mirrors in the OFF position around each mirror in the ON position. This arrangement increases the degree of confocality since the increased number of mirrors in the OFF position screen out additional light from outside of the focal plane. Increasing the size of the neighborhood provides additional confocality. For instance, dividing the sub-regions into 6×6 neighborhoods would further increase confocality than is achieved with a 5×5 neighborhood.

Each sub-region of the light selection optics can have the same pattern or the patterns can be different. When each sub-region of the light selection optics has the same pattern, the view from each detector has the same degree of confocality. However, when each sub-region has a different pattern, the view from each detector has a different degree of confocality. For instance, a single mirror can be on in the entire light selection optics and all the remaining mirrors can be in the OFF position. The detector receiving the light from the ON mirror will have a view with high degree of confocality while the remaining detectors will not have a view of the sample.

During operation of the system 10, the sample 12 is scanned in order to develop an image of the sample 12. In one embodiment, the sample 12 is scanned by sequentially moving a selection of the mirrors between the ON and OFF positions until each mirror occupies the ON position. During the manipulation of the mirrors, the sample 12 is held in a stationary position. Once each mirror in the selection of mirrors has occupied the ON position, the sample 12 is moved and the sequence repeated until the entire sample 12 has been scanned. When the sample 12 is scanned by sequentially turning the mirrors on and off, the problems associated with scanning a laser across a stationary sample 12 are eliminated. Systems 10 which use a laser scan require extremely precise alignment and are often difficult to keep in alignment.

A preferred method of scanning the sample 12 is illustrated in FIG. 5A. In this method, the mirrors are held in a fixed pattern while the sample 12 is moved past the microscope optics 22 as illustrated by the arrow labeled A. When the detector 56 is a TDI sensor, the line scan of the detector 56 is synchronized with the movement of the sample 12. Accordingly, a line of the detectors 56 sees the same portion of the sample 12 as the sample 12 is moved. This method of operation allows the sample 12 to be scanned in one smooth motion.

When the scan occurs by moving the sample 12 and the light selection optics 18 has the pattern illustrated in FIG. 6A, the same portion of the sample 12 passes each of the five image beams 82. Since each of the detectors 56 is scanned synchronously with the sample 12, each time the portion passes through one of the five image beams 82, the detector 56 sees that portion of the sample 12. Accordingly, the detector 56 will be exposed to each portion of the sample 12 five times. Each exposure of the detector 56 to a portion of the sample 12 serves to increase the detectors 56 dwell time on that portion of the sample 12. Accordingly, increasing the number of exposures will increase the resulting image quality.

When the system 10 employs light selection optics 18 having the pattern illustrated in FIG. 6C, each portion of the sample 12 is exposed to a detector 56 twice since each column includes two mirrors in the ON position. As a result, in order to achieve the same dwell time as achieved with the sub-region 74 pattern of FIG. 6A, the sample 12 can be moved at ⅖ the speed that it is for FIG. 6A. Accordingly, the pattern illustrated in FIG. 6C provides a decreased dwell time over what can be accomplished with the pattern of FIG. 6A.

Although the pattern of FIG. 6C provides a lower dwell time, this pattern also provides an increased degree of confocality as disclosed above. Accordingly, there is a tradeoff between the degree of confocality and the dwell time. For instance, the light selection optics 18 pattern illustrated in FIG. 6C provides a higher degree of confocality but lower dwell time and the light selection optics 18 pattern illustrated in FIG. 6A provides a lower degree of confocality but a higher dwell time. The patterns of ON and OFF regions 72A and 72B illustrated in FIGS. 6A and 6B are for illustrative purposes, many other patterns are possible. Additionally, the light selection regions 72 can be controllable so the pattern of light selection regions 72 in the ON and OFF position can be easily switched to any desired pattern.

The pattern on the light selection region can remain constant during a scan. Alternatively, the time that each light selection region is in an ON position can be modulated to vary the intensity of light at the detector from various regions of the light selection optics. For instance, the time that each light selection region is in an on position mirror can be modulated to compensate for variations in the intensity of the light source. Many lasers often produce a beam which is more intense at the center than at the periphery. This inconsistency can be at least partially corrected by adjusting the light selection regions such that the light selection regions receiving light from the center of the beam have less ON time than the light selection regions receiving light from the periphery.

As described above, the light selection optics 18 can be left in a fixed pattern while the sample 12 is moved. Accordingly, light selection optics 18 having light selection regions 72 which are not controllable but are fixed in an ON and OFF position may be desirable. A plurality of light selection optics 18 having fixed arrangements of ON and OFF regions 72B can be arranged on a wheel and the desired light selection optics 18 can be positioned in the light beam 32. As a result, different light selection optics 18 can be used with a single system 10 according to the present invention.

Examples of light selection optics 18 having ON regions 72A which are fixed in the ON and OFF position include mirrors which are fixed in a position which reflects light toward the sample 12 and mirrors fixed in a position which reflect the light out of the system 10. Alternatively, the light selection optics 18 can be any material with reflective regions and opaque regions in a desired position. Further, the light selection optics 18 can be transmissive instead of reflective. For instance, the light selection optics can be a liquid crystal light valve (LCLV) such as one of the CdSe or CdS based light LCLVs available from Control Optics Corporation of Baldwin Park, Calif.

In another embodiment, the light selection optics 18 can also work through transmission. For instance, the light selection optics 18 can include a plurality of apertures in a desired pattern. The light selection optics 18 can then be positioned between the sample 12 and the detectors 56.

Figure 7:
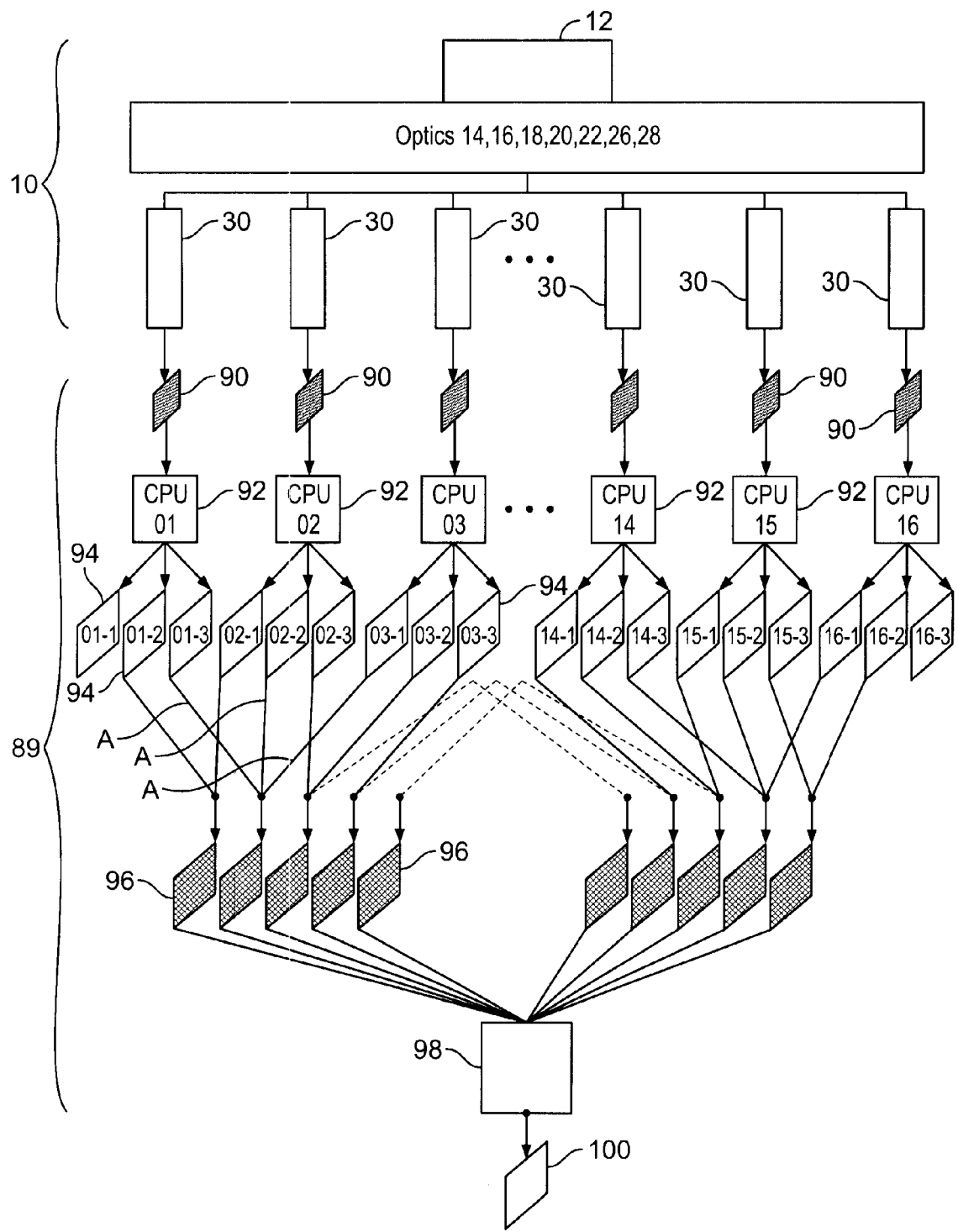
FIG. 7 illustrates processing to carry out a three dimensional filter of a three dimensional image from the output of a system according to the present invention.

FIG. 7 illustrates a processing architecture 89 that can be included in the optical system 10 described above for the purposes of processing, filtering, generating and storing an image from the outputs of the detectors 56. The collection of digital representation of the 2D images 90 seen by each detector 56 comprise the original 3D image of the sample. Each 2D image 90 is received at a processor 92 (CPU) as the sample 12 is being scanned. Each processor 92 operates from a set of instructions included on a computer readable medium (not shown) such as a floppy disk, hard drive, memory, compact disk, etc. The computer readable medium includes instructions for processing and analyzing the 3D image of the sample. A specific example application of a three dimensional FIR filter is shown. Although an N×N×3 filter is shown for illustrative purposes, a 7×7×7 filter is preferred and other dimensions X×Y×Z are possible. Each processor 92 convolves each received two dimensional image 90 with all three kernels of the 3D FIR filter to produce three intermediate 2D filtered images 94. Each intermediate 2D filtered images 94 is summed with an intermediate 2D filtered images 94 from other processors 92 as illustrated by the arrows labeled A. Summing the intermediate 2D filtered images 94 as illustrated produces a plurality of filtered 2D images 96 that together comprise a filtered 3D image. Although not shown, the original 3D image is also maintained for viewing, further processing or storage. 3D filtering can be used to perform image segmentation, deconvolution, and many other useful operations as disclosed in U.S. Pat. No. 5,548,661 entitled "Operator Independent Image Cytometer" and U.S. Pat. No. 5,790,692 entitled "Method and Means of Least Squares Designed Filters for Image Segmentation in Scanning Cytometry." These operations can be used to find objects in the original 3D image (e.g. the collection of 2D images) and to identify or classify the objects.

All of the processors 92 are in communication with a host processing unit 98 such as a 4 CPU computer. The host processing unit operates from instructions included on a machine readable medium (not shown). The machine readable medium includes instructions for combining the filtered 2D images 96 to produce a final three dimensional image and for displaying this image on a display unit 100. The filtered 2D images 96 can be received via a 1.0 gigabit/s Ethernet. This network is preferably a dedicated locally controlled network operated through a switch providing 1 gigabit/s for each pair of connections in order to increase the ability to handle large module data transfers.

The processors 92 can be included in a processing unit such as the Pentium III Xeon 512 KB L2 cache system clocked at 800 MHz, which includes two processors 92. Accordingly, an optical system 10 including 16 detectors 56 would require a processing architecture 89 with 8 of these processing units. Suitable instructions for performing two dimensional convolutions can be found using the Imaging Library available from the Intel Corporation, San Jose, Calif. Using this instruction set, the above processing architecture is able to perform a 7×7 convolution on a 512×512 pixel image in about 30 ms. Accordingly, the desired 7×7×7 convolutions require approximately 210 ms. It is therefore possible to process the three dimensional images as they are acquired. It is expected that this system, or one with moderately increased CPU speed will process the 160 MHz voxel rate. Further increases in computer processing power will allow simpler configurations with lower numbers of CPU's in the future.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An imaging system, comprising:
a light source to produce at least one beam;
focus differentiation optics located in an optical pathway of the at least one beam to divide the at least one beam into a plurality of sub-beams aimed at different locations away from the focus differentiation optics;
microscope optics to focus the plurality of sub-beams at respective focal planes at the different locations, respectively;
a sample holder to hold a sample to occupy a sample volume that overlaps at least some of the different locations of the respective focal planes; and
a plurality of detector assemblies positioned to receive the light from at least some of the different locations,
wherein the focus differentiation optics comprises a plurality of sub-beam definition modules, each sub-beam definition module has a first side and a corresponding second side, the first side being substantially parallel to the corresponding second side, and
wherein the distance between the first side and the corresponding second side of each sub-beam definition module is different from one another.

2. The system as in claim 1, wherein the plurality of sub-beam definition modules are movable independent of one another.

3. The system as in claim 1, further comprising:
a scanning mechanism to scan the sample holder and the microscope optics relative to the each other to project the plurality of sub-beams to different locations of the sample holder.

4. The system as in claim 1, further comprising:
light selection optics positioned in the optical pathway between the sample and the plurality of detector assemblies to direct a portion of light originating at the different focal plane of each sub-beam to the plurality of detector assemblies while screening out light originating from outside the different focal plane of each sub-beam.

5. The system as in claim 4, wherein the light selection optics includes a plurality of ON regions and a plurality of OFF regions, the plurality of ON regions directing the light from the respective focal plane of each sub-beam to the plurality of detector assemblies and the plurality of OFF regions blocking the light from the respective focal plane of each sub-beam.

6. The system as in claim 4, further comprising:
relay optics positioned in an optical pathway between the light selection optics and the plurality of detector assemblies.

7. The system as in claim 6, further comprising:
divergence optics positioned in an optical pathway between the relay optics and the plurality of detector assemblies.

8. The system as in claim 4, wherein the light selection optics is positioned to direct by reflection a portion of light originating at the respective focal plane of each sub-beam to the respective detector assembly while screening out light originating from outside the respective focal plane of each sub-beam using a digital micromirror device.

9. The system as in claim 4, wherein the light selection optics is positioned to direct by transmission a portion of light originating at the respective focal plane of each sub-beam to the respective detector assembly while screening out light originating from outside the respective focal plane of each sub-beam using a liquid crystal light valve.

10. The system as in claim 4, wherein the light selection optics includes a plurality of ON regions and a plurality of OFF regions, the plurality of ON regions directing the light from the respective focal plane of each sub-beam to the plurality of detector assemblies and the plurality of OFF regions blocking the light from the respective focal plane of each sub-beam.

11. The system as in claim 4, further comprising:
relay optics positioned in an optical pathway between the light selection optics and the plurality of detector assemblies.

12. The system as in claim 11, further comprising:
divergence optics positioned in an optical pathway between the relay optics and the plurality of detector assemblies.

13. The system as in claim 1, wherein each detector assembly is positioned approximately the same distance from the focus differentiation optics.

14. The system as in claim 1, wherein each detector assembly includes magnification adjustment optics to provide the view from each detector assembly with the same degree of magnification.

15. The system as in claim 1, wherein each detector assembly is electrically controlled to produce time-delay-and-integration.

16. The system as in claim 1, further comprising a plurality of processors to process a 3D image from the outputs of the plurality of detector assemblies.

17. The system as in claim 1, wherein each detector assembly includes magnification adjustment optics to provide the view from each detector assembly with the same degree of magnification.

18. The system as in claim 1, wherein each detector assembly is electrically controlled to produce time-delay-and-integration.

19. The system as in claim 1, further comprising a plurality of processors to process a 3D image from the outputs of the plurality of detector assemblies.

20. An imaging system, comprising:
a light source to produce at least one beam;
focus differentiation optics located in an optical pathway of the at least one beam to divide the at least one beam into a plurality of sub-beams aimed at different locations away from the focus differentiation optics;
microscope optics to focus the plurality of sub-beams at respective focal planes at the different locations, respectively;
a sample holder to hold a sample to occupy a sample volume that overlaps at least some of the different locations of the respective focal planes;
a plurality of detector assemblies positioned to receive the light from at least some of the different locations; and
light selection optics positioned in the optical pathway between the sample and the plurality of detector assemblies to direct a portion of light originating at the different focal plane of each sub-beam to the plurality of detector assemblies while screening out light originating from outside the different focal plane of each sub-beam, wherein the light selection optics is positioned to direct by reflection a portion of light originating at the respective focal plane of each sub-beam to the respective detector assembly while screening out light originating from outside the respective focal plane of each sub-beam using a digital micromirror device.

21. The system as in claim 20, wherein the focus differentiation optics comprises a plurality of sub-beam definition modules.

22. The system as in claim 21, wherein the plurality of sub-beam definition modules are movable independent of one another.

23. The system as in claim 21, wherein each sub-beam definition module has a first side and a corresponding second side, the first side being substantially parallel to the corresponding second side.

24. The system as in claim 23, wherein the distance between the first side and the corresponding second side of each sub-beam definition module is different from one another.

25. The system as in claim 20, wherein the light selection optics includes a plurality of ON regions and a plurality of OFF regions, the plurality of ON regions directing the light from the respective focal plane of each sub-beam to the plurality of detector assemblies and the plurality of OFF regions blocking the light from the respective focal plane of each sub-beam.

26. The system as in claim 20, further comprising:
relay optics positioned in an optical pathway between the light selection optics and the plurality of detector assemblies.

27. The system as in claim 26, further comprising:
divergence optics positioned in an optical pathway between the relay optics and the plurality of detector assemblies.

28. The system as in claim 20, wherein each detector assembly is positioned approximately the same distance from the focus differentiation optics.

29. The system as in claim 20, wherein each detector assembly includes magnification adjustment optics to provide the view from each detector assembly with the same degree of magnification.

30. The system as in claim 20, wherein each detector assembly is electrically controlled to produce time-delay-and-integration.

31. The system as in claim 20, further comprising a plurality of processors to process a 3D image from the outputs of the plurality of detector assemblies.

32. An imaging system, comprising:
a light source to produce at least one beam;
focus differentiation optics located in an optical pathway of the at least one beam to divide the at least one beam into a plurality of sub-beams aimed at different locations away from the focus differentiation optics;
microscope optics to focus the plurality of sub-beams at respective focal planes at the different locations, respectively;
a sample holder to hold a sample to occupy a sample volume that overlaps at least some of the different locations of the respective focal planes;
a plurality of detector assemblies positioned to receive the light from at least some of the different locations; and
light selection optics positioned in the optical pathway between the sample and the plurality of detector assemblies to direct a portion of light originating at the different focal plane of each sub-beam to the plurality of detector assemblies while screening out light originating from outside the different focal plane of each sub-beam, wherein the light selection optics is positioned to direct by transmission a portion of light originating at the respective focal plane of each sub-beam to the respective detector assembly while screening out light originating from outside the respective focal plane of each sub-beam using a liquid crystal light valve.

33. The system as in claim 32, wherein the focus differentiation optics comprises a plurality of sub-beam definition modules.

34. The system as in claim 33, wherein the plurality of sub-beam definition modules are movable independent of one another.

35. The system as in claim 33, wherein each sub-beam definition module has a first side and a corresponding second side, the first side being substantially parallel to the corresponding second side.

36. The system as in claim 35, wherein the distance between the first side and the corresponding second side of each sub-beam definition module is different from one another.

37. The system as in claim 32, wherein the light selection optics includes a plurality of ON regions and a plurality of OFF regions, the plurality of ON regions directing the light from the respective focal plane of each sub-beam to the plurality of detector assemblies and the plurality of OFF regions blocking the light from the respective focal plane of each sub-beam.

38. The system as in claim 32, further comprising:
relay optics positioned in an optical pathway between the light selection optics and the plurality of detector assemblies.

39. The system as in claim 38, further comprising:
divergence optics positioned in an optical pathway between the relay optics and the plurality of detector assemblies.

40. The system as in claim 32, wherein each detector assembly is positioned approximately the same distance from the focus differentiation optics.

41. The system as in claim 32, wherein each detector assembly includes magnification adjustment optics to provide the view from each detector assembly with the same degree of magnification.

42. The system as in claim 32, wherein each detector assembly is electrically controlled to produce time-delay-and-integration.

43. The system as in claim 32, further comprising a plurality of processors to process a 3D image from the outputs of the plurality of detector assemblies.

44. An imaging system, comprising:
a light source to produce at least one beam;
focus differentiation optics located in an optical pathway of the at least one beam to divide the at least one beam into a plurality of sub-beams aimed at different locations away from the focus differentiation optics;
microscope optics to focus the plurality of sub-beams at respective focal planes at the different locations, respectively;
a sample holder to hold a sample to occupy a sample volume that overlaps at least some of the different locations of the respective focal planes;
a plurality of detector assemblies positioned to receive the light from at least some of the different locations; and
light selection optics positioned in the optical pathway between the sample and the plurality of detector assemblies to direct a portion of light originating at the different focal plane of each sub-beam to the plurality of detector assemblies while screening out light originating from outside the different focal plane of each sub-beam,
wherein the light selection optics includes a plurality of ON regions and a plurality of OFF regions, the plurality of ON regions directing the light from the respective focal plane of each sub-beam to the plurality of detector assemblies and the plurality of OFF regions blocking the light from the respective focal plane of each sub-beam, and wherein the plurality of ON regions are controllably changed to OFF regions and the plurality of OFF regions are controllably changed to ON regions.

45. The system as in claim 44, wherein the focus differentiation optics comprises a plurality of sub-beam definition modules.

46. The system as in claim 44, wherein the plurality of sub-beam definition modules are movable independent of one another.

47. The system as in claim 44, wherein each sub-beam definition module has a first side and a corresponding second side, the first side being substantially parallel to the corresponding second side.

48. The system as in claim 47, wherein the distance between the first side and the corresponding second side of each sub-beam definition module is different from one another.

49. The system as in claim 48, wherein the light selection optics includes a plurality of ON regions and a plurality of OFF regions, the plurality of ON regions directing the light from the respective focal plane of each sub-beam to the plurality of detector assemblies and the plurality of OFF regions blocking the light from the respective focal plane of each sub-beam.

50. The system as in claim 48, further comprising:
relay optics positioned in an optical pathway between the light selection optics and the plurality of detector assemblies.

51. The system as in claim 50, further comprising:
divergence optics positioned in an optical pathway between the relay optics and the plurality of detector assemblies.

52. The system as in claim 48, wherein each detector assembly is positioned approximately the same distance from the focus differentiation optics.

53. The system as in claim 48, wherein each detector assembly includes magnification adjustment optics to provide the view from each detector assembly with the same degree of magnification.

54. The system as in claim 48, wherein each detector assembly is electrically controlled to produce time-delay-and-integration.

55. The system as in claim 48, further comprising a plurality of processors to process a 3D image from the outputs of the plurality of detector assemblies.

56. An imaging system, comprising:
a light source to produce at least one beam;
a dichroic mirror to transmit a portion of the at least one beam;
focus differentiation optics to divide the portion of the at least one beam into a plurality of sub-beams;
microscope optics to focus the sub-beams at respective focal planes, respectively;
a sample holder to hold a sample to occupy a sample volume that overlaps at least some of the different locations of the respective focal planes;
light selection optics positioned and configured to reflect a portion of the plurality of sub-beams originating at the respective focal planes while blocking a portion of the plurality of sub-beams not originating at the respective focal planes;
dichroic mirror positioned and configured to reflect a portion of the plurality of sub-beams reflected by the light selection optics;
relay optics to transmit the portion of the plurality of sub-beams reflected by the dichroic mirror;
divergence optics to direct each sub-beam reflected by the dichroic mirror;
a plurality of detector assemblies, each detector assembly receiving a respective sub-beam directed by the divergence optics; and
a plurality of processors to process a 3D image from the outputs of the plurality of detector assemblies.

57. The system as in claim 56, wherein the light source includes a Kr/Ar continuous wave laser having greater than 1 W per line at 488, 568, and 647 nm, and a 488 nm Argon-ion laser.

58. The system as in claim 56, wherein the divergence optics includes a primary beam diverger and a secondary beam diverger.

59. The system as in claim 58, wherein the primary beam diverger includes two mirrors, the mirrors positioned to divert a first portion of the plurality of sub-beams directed by the divergence optics in one direction and a second portion of the plurality of the sub-beams directed by the divergence optics in another direction.

60. The system as in claim 58, wherein the secondary beam diverger includes a plurality of mirrors positioned to reflect each sub-beam diverted by the primary beam diverger to the respective detector assembly.

61. A method for imaging a sample, comprising:
illuminating the sample with at least one beam from a light source;
dividing the at least one beam into a plurality of sub-beams aimed at different locations away from the focus differentiation optic;
focusing the plurality of sub-beams at respective focal planes at the different locations;
holding a sample to occupy a sample volume that overlaps at least some of the different locations of the respective focal plane;
detecting an image of the sample with a plurality of detector assemblies;
processing, filtering, generating, and storing an image of the sample using a processing, filtering, generating, and storage system;
directing the input to each detector assembly as an image output to a corresponding processor of a plurality of processors of the processing, filtering, generating, and storage system; and
convolving the image output of each detector assembly using the corresponding processor of the processing, filtering, generating, and storage system to produce three intermediate 2D filtered images.

62. The method of claim 61, further comprising:
directing a portion of light originating at the different focal plane of each sub-beam to each detector assembly while screening out light from outside the different focal plane of each sub-beam.

63. The method of claim 61, further comprising:
diverting each sub-beam to a corresponding detector assembly.

64. A method of claim 61, further comprising summing the intermediate 2D filtered images convolved by each processor to produce a plurality of 2D filtered images that comprise a filtered 3D image.

* * * * *

UNITED STATES PATENT AND TRADEMARK OFFICE
CERTIFICATE OF CORRECTION

PATENT NO. : 7,358,478 B2  Page 1 of 1
APPLICATION NO. : 11/433049
DATED : April 15, 2008
INVENTOR(S) : Jeffrey H. Price It is certified that error appears in the above-identified patent and that said Letters Patent is hereby corrected as shown below:

IN THE TITLE PAGE:
Column 1, Item (75) (Inventor) delete "Solana Beach," and insert --Rancho Santa Fe,--;

IN THE CLAIMS:
Column 16, line 57, (Claim 46) delete "claim 44," and insert --claim 45,--;

Column 16, line 60, (Claim 47) delete "claim 44," and insert --claim 45,--;

Column 17, line 1, (Claim 49) delete "claim 48," and insert --claim 44,--;

Column 17, line 8, (Claim 50) delete "claim 48," and insert --claim 44,--;

Column 17, line 16, (Claim 52) delete "claim 48," and insert --claim 44,--;

Column 17, line 19, (Claim 53) delete "claim 48," and insert --claim 44,--;

Column 17, line 23, (Claim 54) delete "claim 48," and insert --claim 44,--;

Column 17, line 26, (Claim 55) delete "claim 48," and insert --claim 44,--.

Signed and Sealed this

Second Day of December, 2008

JON W. DUDAS
*Director of the United States Patent and Trademark Office*